United States Patent [19]

Ieki et al.

[11] Patent Number: 5,182,613
[45] Date of Patent: Jan. 26, 1993

[54] POSITION DETECTING APPARATUS GENERATING PERIODIC DETECTION SIGNALS HAVING EQUAL THIRD AND FIFTH HARMONIC COMPONENTS

[75] Inventors: Atsushi Ieki; Yasukazu Hayashi; Keiji Matsui, all of Niwa, Japan

[73] Assignee: Okuma Corporation, Aichi, Japan

[21] Appl. No.: 735,908

[22] Filed: Jul. 25, 1991

[30] Foreign Application Priority Data

Jul. 30, 1990 [JP] Japan .................. 2-201715

[51] Int. Cl.$^5$ .................. H01J 3/14; G01B 11/14
[52] U.S. Cl. .................. 356/374; 250/237 G; 250/231.16
[58] Field of Search .......... 356/373, 374, 375, 356, 356/358; 250/231.14, 231.16, 237 G, 231.18; 33/706, 707

[56] References Cited

U.S. PATENT DOCUMENTS

| | | | |
|---|---|---|---|
| 4,346,447 | 8/1982 | Takahama | 250/231.16 |
| 4,848,911 | 7/1989 | Uchida et al. | 356/356 |
| 4,972,080 | 11/1990 | Taniguchi | 250/231.16 |
| 4,985,623 | 1/1991 | Ichikawa et al. | 250/231.16 |
| 5,068,530 | 11/1991 | Ieki et al. | 356/374 |

Primary Examiner—Richard A. Rosenberger
Assistant Examiner—Hoa Q. Pham
Attorney, Agent, or Firm—Wenderoth, Lind & Ponack

[57] ABSTRACT

A displacement detecting device generates first and second periodic signals in accordance with a displacement of a relatively movable object. The first and second periodic signals have differing phases relative to each other and each include a third harmonic component and a fifth harmonic component which are approximately equal to each other. The third and fifth harmonic components are equalized by setting a distance between first and second gratings of the position detection device. By equalizing the third and fifth harmonic components of the periodic detection signals, detection errors are reduced.

5 Claims, 5 Drawing Sheets

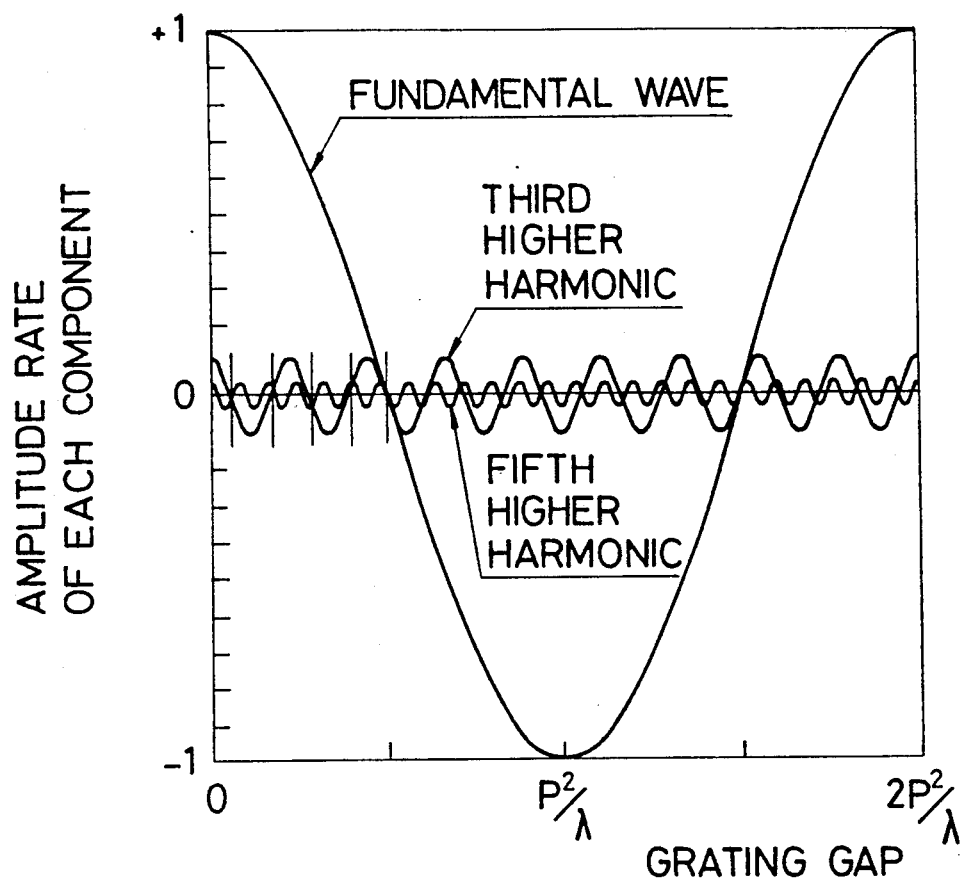
F I G. 3
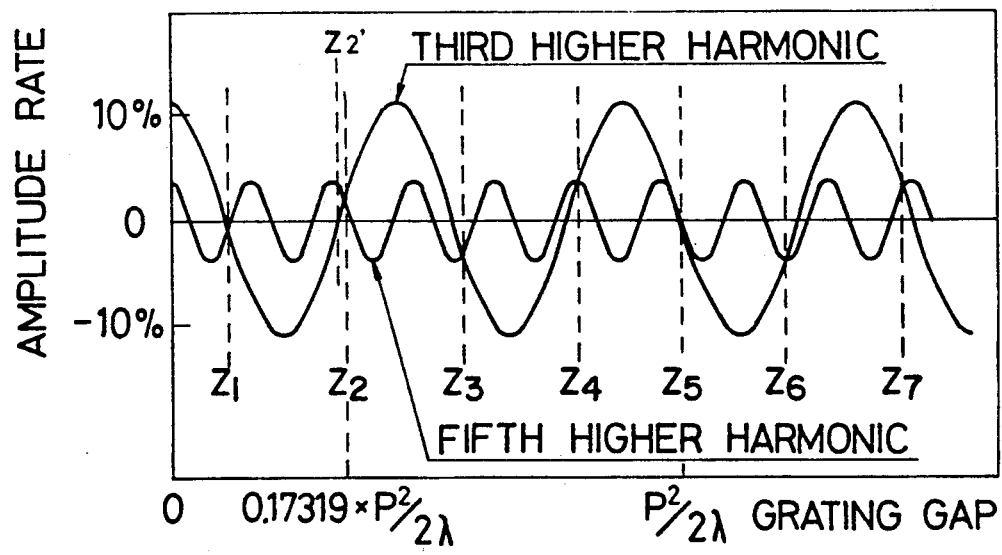
F I G. 4

POSITION DETECTING APPARATUS GENERATING PERIODIC DETECTION SIGNALS HAVING EQUAL THIRD AND FIFTH HARMONIC COMPONENTS

BACKGROUND OF THE INVENTION

The present invention relates to a position detecting apparatus which can be used for position measurement in, for example, a semiconductor manufacturing apparatus and machine tools such as a lathe, a milling machine and the like.

FIG. 1 is an oblique projection constructional view showing an example of an optical encoder which is known as a conventional position detecting apparatus. The position detecting apparatus comprises a first diffraction grating (which is referred to as "first grating" hereinafter) 1, a second diffraction grating (which is referred to as "second grating" hereinafter) 2 which is disposed at the back of the first grating 1 and which is capable of moving relative to the first grating 1 in a direction of the arrow shown in FIG. 1, and a photo detector 3 disposed behind the second grating 2. The first grating 1 and the second grating 2 have grating portions alternating at a predetermined interval (which is referred to as "grating pitch" hereinafter), the grating portions comprise portions (which are referred to as "transparent portions" hereinafter) which allow lights to pass through and portions (which are referred to as "non-transparent portions") which block passage of lights. Particularly, for the second grating 2 there are provided two grating portions having a predetermined phase difference relative to each other. The photo detector 3 is connected to a data converting section 5 to convert outputs of the photo detector 3 into positional data to be outputted.

In the above configuration, when parallel light beams L are irradiated to the first grating 1, only the light beams which have passed through the first grating 1 and the second grating 2 are received by the photo detector 3, in which the incident rays are converted to an electric signal according to the light intensity thereof. The electric signal can be obtained from variations of a quantity of light having passed through the first grating 1 and the second grating 2 in accordance with the relative displacement of the gap between the first grating 1 and the second grating 2. Consequently, the electric signal is formed of the displacement signal having a fundamental period of the grating pitch. Furthermore, the displacement signal must theoretically, be a triangular wave signal proportional to a variation of the apparent transparent portion which is, when viewed from the irradiating point, formed by the extent to which the first grating 1 and the second grating 2 overlap each other. In practice, however, the displacement signal forms a pseudo-sine wave because the triangular wave is rounded by the effects light diffraction and so on. The distortion rate of the displacement signal changes to a great extent depending upon the gap or space between the first grating 1 and the second grating 2. FIG. 2 shows the behavior of variations of the displacement signal with respect to variation of the grating gap ranging from $0.04 \times P^2/\lambda$ to $0.275 \times P^2/\lambda$ (here, P denotes grating pitch, and $\lambda$ denotes wave length of the light source). The variations of the distortion rate are primarily caused by periodic signals (which are respectively referred to as "third higher harmonic component" and "fifth higher harmonic component" hereinafter) having one-third or one-fifth the period of a fundamental wave. Amplitude ratios of the fundamental wave component, the third higher harmonic component and the fifth higher harmonic component of the displacement signal are plotted with respect to the value of the grating in FIG. 3, and the partial enlargement thereof is shown in FIG. 4. Each of these components can be approximately defined by the following expression (1), where f(x) is taken as the displacement signal.

$$F(x) = \cos\left(\pi \frac{\lambda}{P^2} Z\right) \cdot \cos\left(2\pi \frac{x}{P}\right) + \frac{1}{9} \cos\left(9\pi \frac{\lambda}{P^2} Z\right) \cdot \cos\left(3 \cdot 2\pi \frac{x}{P}\right) + \frac{1}{25} \cos\left(25\pi \frac{\lambda}{P^2} Z\right) \cdot \cos\left(5 \cdot 2\pi \frac{x}{P}\right) \quad (1)$$

where x denotes displacement and z denotes the grating gap.

It should be noted that even higher harmonic components as well as offset components can be generally canceled by proper optical arrangement, and the higher harmonic components of the seventh, and ninth order and higher, having little effect on the detecting precision, can be neglected and assumed to be zero. In the case where a low coherent light source such as an LED or the like is employed, the displacement signal f(x) is damped in its amplitude in proportion to an increment of the grating gap. The displacement signal, however, holds the basic characteristics equal to the above expression (1).

Supposing that signals $W_a$ and $W_b$ outputted from the photo detector 3 have a phase difference of $\pi/2$(rad) relative to each other, the signals $W_a$ and $W_b$ are represented by the following expression (2).

$$\left. \begin{array}{l} W_a = \cos x + a \cdot \cos 3x + a \cdot k \cdot \cos 5x \\ W_b = \sin x - a \cdot \sin 3x + a \cdot k \cdot \sin 5x \end{array} \right\} \quad (2)$$

The data converting section 5 includes comparators and resistance arrays to shift phases of the signals $W_a$ and $W_b$, and determines positional data $P_{os}$ to be outputted.

In the above conventional method, the displacement signal having the above described characteristics has been used in which the distorted waveform closest to sine wave has been adapted, whereby no existing grating gap is sufficient to obtain a fundamental wave component in which both the third and fifth higher harmonic components are rendered zero. Consequently, the third and fifth higher harmonic components disadvantageously have caused errors to a significant extent in the detected displacement quantity. As is shown in FIG. 4, for example, even though a condition is set up so that the grating gap is to be $Z_2'$ in order to eliminate the third higher harmonic component to obtain a less distorted waveform, the fifth higher harmonic component is liable to create significant errors.

SUMMARY OF THE INVENTION

The present invention has been accomplished in view of what is discussed above, and an object of the present invention is to provide a position detecting apparatus which does not yield errors in the displacement detection quantity.

According to one aspect of the present invention, for achieving the objects described above, there is provided a position detecting apparatus wherein positional data are outputted based on at least two periodic signals outputted in accordance with a displacement of a relatively movable object, comprising a displacement detecting mechanism outputting said signal with adding a component having a period of one-third the period of said signal and approximately equivalent of another component having a period of one-fifth the period of said signal, and an operation means capable of determining and outputting positional data by receiving the signal from the displacement detecting mechanism to be subjected to an arc tangent operation.

These and other objects, features and advantages of the invention will become more readily apparent from the following detailed description when taken in conjunction with the illustrated embodiment in the accompany drawings.

BRIEF DESCRIPTION OF THE DRAWINGS

In the accompanying drawings:

FIG. 3 is a diagram showing amplitudes of the fundamental wave component, one-third period component, and one-fifth period component of the displacement signal with respect to variations of the grating gap in the optical type encoder;

FIG. 4 is a partial enlarged diagram of FIG. 3.

DESCRIPTION OF THE PREFERRED EMBODIMENT

Figure 5:
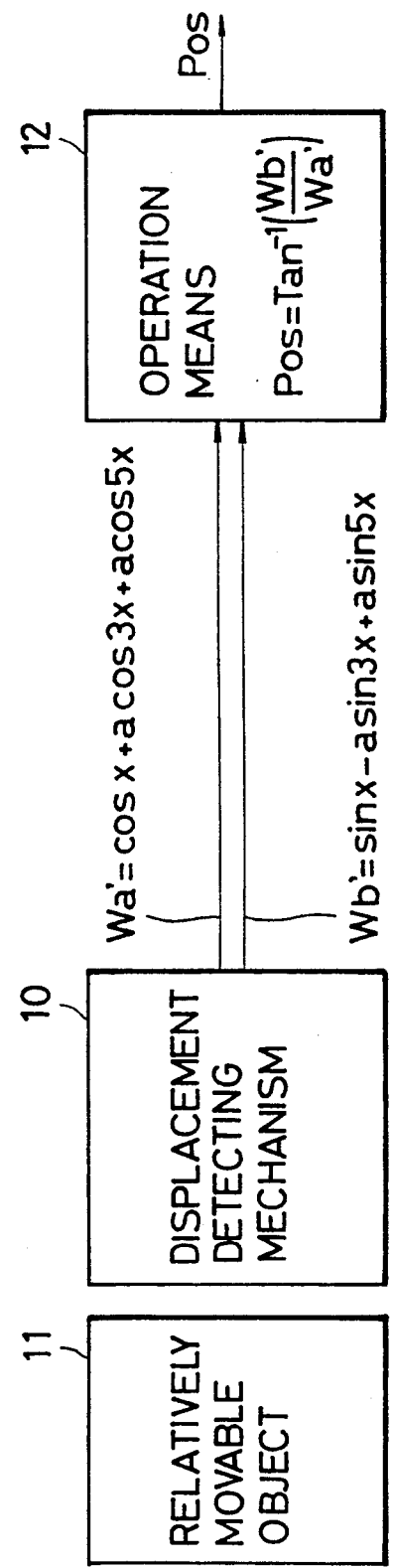
FIG. 5 is a diagram showing an example of a position detector according to the present invention.

FIG. 5 is a diagram showing an example of a position detecting apparatus according to the present invention. The apparatus includes a displacement detecting mechanism 10, which outputs at least two periodically varying signals $W_a'$ and $W_b'$ in accordance with the relative displacement yielded by a relatively movable object 11. It should be noted that, although there may be some cases in which a clear distinction can not be made between the relatively movable object 11 and the displacement detecting mechanism 10, the distinction is made in the case of FIG. 5. There is an operation means 12, which perform arc tangent operations from the varying signals $W_a'$ and $W_b'$.

Firstly, a ratio of the signal $W_b'$ to the signal $W_a'$ is calculated (as represented by the following expression (3)).

$$\frac{W_b'}{W_a'} = \frac{\sin x - a \cdot \sin 3x + a \cdot k \cdot \sin 5x}{\cos x + a \cdot \cos 3x + a \cdot k \cdot \cos 5x} \quad (3)$$

Here, the displacement detecting mechanism 10 is adapted to set up a condition that the third higher harmonic component is to be equal to the fifth higher harmonic component so as to hold k=1 and consequently substituting k=1 onto the above expression (3), the following relation (4) can be obtained:

$$\frac{W_b'}{W_a'} = \frac{\sin x}{\cos x} \quad (4)$$

Further, followed by an arc tangent operation:

$$\tan^{-1}\frac{\sin x}{\cos x} = x \quad (5)$$

is obtained, thus making it possible to determine a displacement x completely free from error.

Figure 1:
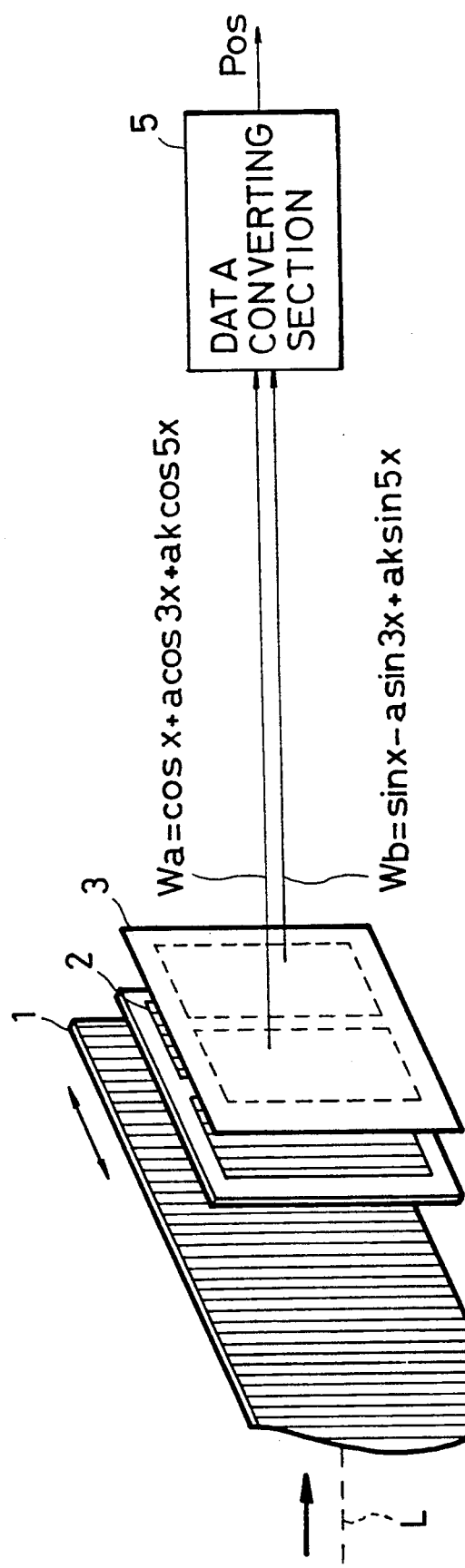
FIG. 1 is an oblique projection constructional view showing an example of an optical type encoder of the conventional position detecting apparatus.
Figure 2:
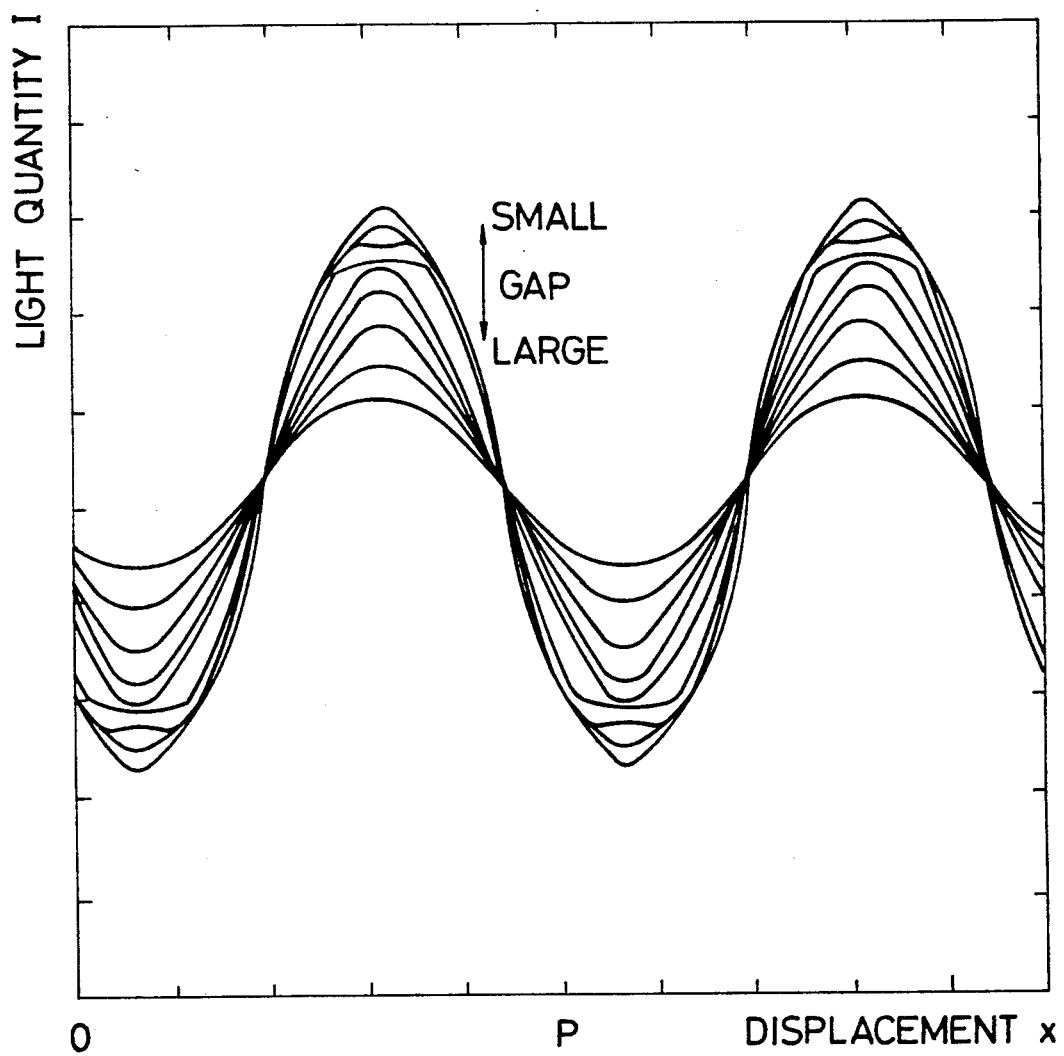
FIG. 2 is diagram showing displacement signals with respect to variations of the grating gap in the optical type encoder.
Figure 6:
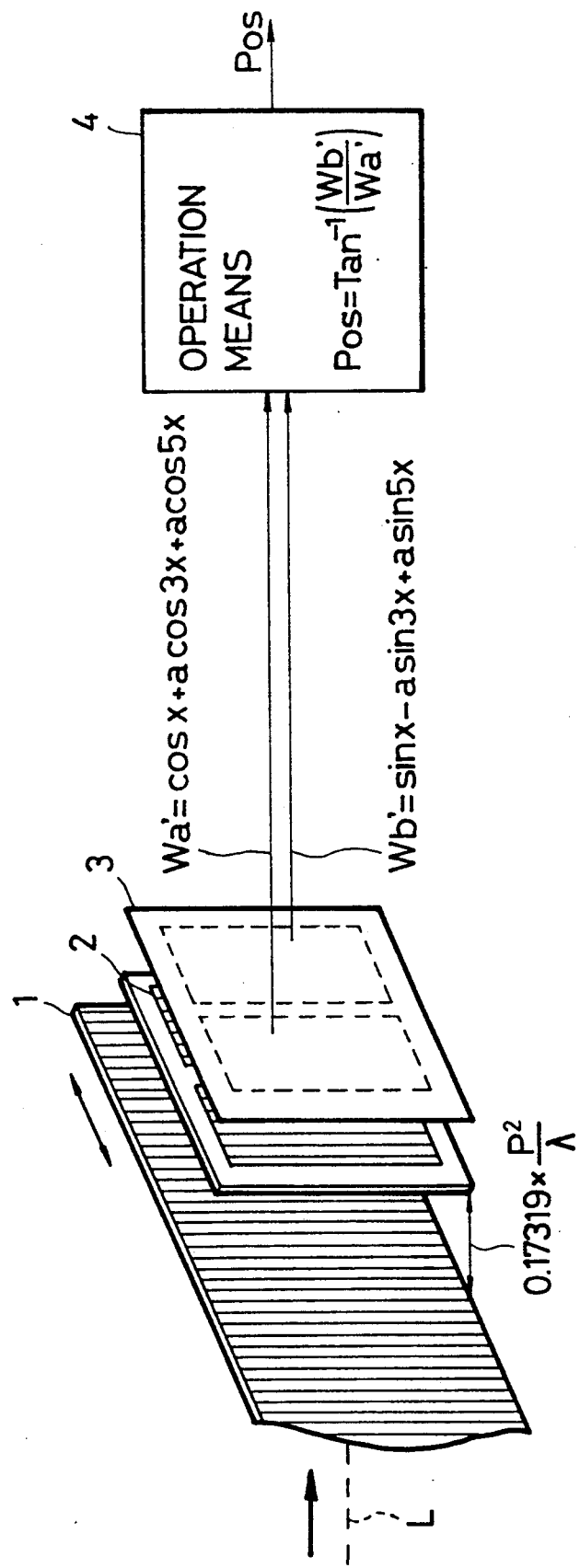
FIG. 6 is an oblique projection constructional view showing an example of an optical type encoder of the position detecting apparatus according to the present invention.

FIG. 6 shows an oblique projection constructional view of an example of an optical type encoder of the position detecting apparatus according to the present invention. This figure corresponds to FIG. 1, so that the explanation of the corresponding portions are omitted and are denoted the same numerals. In this optical type encoder, the gap between the first grating 1 and the second grating 2 is set up to be "$0.17319 \times P^2/\lambda$", so that the third higher harmonic component corresponds with the fifth higher harmonic component in its quantity and phase, thus making it possible to determine the displacement x completely free from error in the same manner as discussed in connection with FIG. 5.

In the above embodiment, means for eliminating the error is representatively performed by adopting a condition that the grating gap is to be "$0.17379 \times P^2/\lambda$". The same effect, however, can be obtained by setting the gap to any value selected from $Z_1$ to $Z_4$ which are present to satisfy the required condition as shown in FIG. 4. It is noted that $Z_1$ is $0.05777 \times P^2/\lambda$, $Z_2$ is $0.17379 \times P^2/\lambda$, $Z_3$ is $0.28814 \times P^2/\lambda$ and $Z_4$ is $0.40178 \times P^2/\lambda$. However, when the set up range is taken into account so that the amplitude of the fundamental wave may be ensured, it is desirable to set up the condition value to be $Z_1$ or $Z_2$. On the other hand, if a light source such as a semiconductor laser or the like is adopted, it is possible to set up the condition value to be $Z_6$ or $Z_7$, etc. $Z_8$, . . . . In the case where a light source such as an LED and the like is employed, the amplitude is liable to damp due to the large grating gap, thus making it difficult to acquire a sufficient contrast.

It should be noted that the embodiment detailed above is discussed for the optical encoder detecting a linear displacement, it is also possible to apply the present invention to an optical type rotary encoder, a magnetic type encoder or a resolver.

According to the position detecting apparatus of the present invention, since it is possible to carry out a highly precise position detection without yielding any errors, a high precision machining can be performed in, for example, a machine tool, thus making it possible to improve a production efficiency In the foregoing, the present invention has been described in conjunction with the preferred embodiments illustrated in the drawings. It should be appreciated, however, that the invention is not restricted to these embodiments. Various modifications and variations will readily occur to those skilled in the art without departing from the spirit and scope of the invention.

What is claimed is:

1. A position detection apparatus comprising:
    displacement detecting means for generating first and second periodic signals in accordance with a displacement of a relatively movable object, said first and second periodic signals differing in phase relative to each other and each including a third harmonic component and a fifth harmonic component which are approximately equal to one another;

positional data generating means for processing said first and second periodic signals to obtain and output corresponding positional data denoting a relative position of relatively movable object.

2. An apparatus as recited in claim 1, wherein said first periodic signal is representative of a cosine function and said second periodic signal is representative of a sine function, and wherein said processing carried out by said positional data generating means is an arc tangent operation.

3. An apparatus as recited in claim 1, wherein said displacement detecting means includes:
- a light source for irradiating light having a wavelength $\lambda$;
- a first grating having a grating pitch P;
- a second grating having a plurality of grating portions of differing phase, said second grating being movable relative to said first grating and being spaced from said first grating by a predetermined gap, said first grating interposed between said light source and said second grating; and,
- a photo detector, said second grating interposed between said first grating and said photo detector;
wherein said predetermined gap results in said third harmonic component and said fifth harmonic component of each of said first and second periodic signal being approximately equal one another.

4. An apparatus as recited in claim 3, wherein said predetermined gap is approximately equal to any one of $0.05777 \times P^2/\lambda$, $0.017379 \times P^2/\lambda$, $0.28814 \times P^2/\lambda$ and $0.40178 \times P^2/\lambda$.

5. An apparatus as recited in claim 4, wherein said first periodic signal is representative of a cosine function and said second periodic signal is representative of a sine function, and wherein said processing carried out by said positional data generating means is an arc tangent operation.

* * * * *